Figure 1:
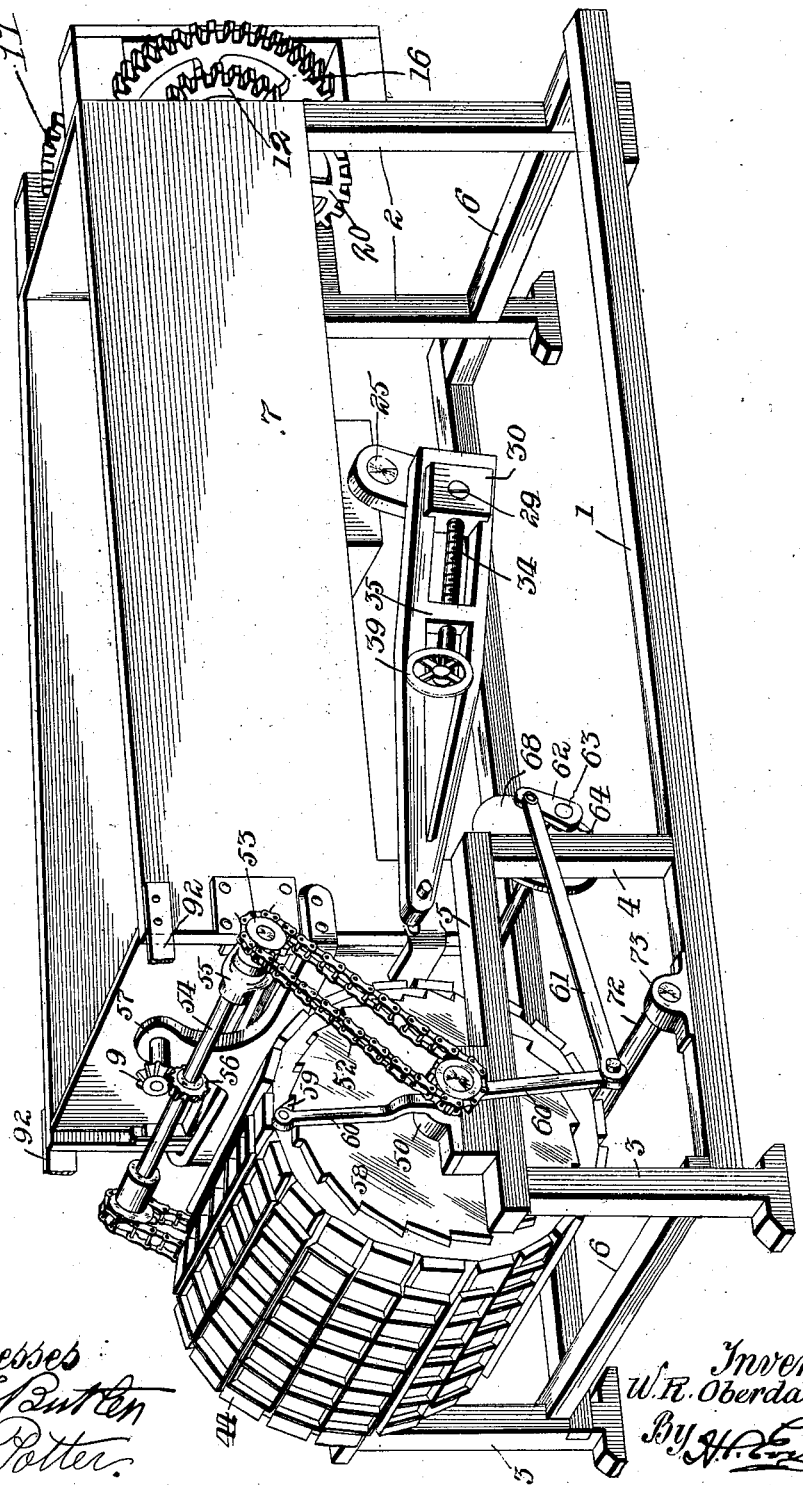

No. 750,059. PATENTED JAN. 19, 1904.
W. R. OBERDAHN.
BRICK MAKING MACHINE.
APPLICATION FILED MAR. 2, 1903.
NO MODEL. 5 SHEETS—SHEET 1.

Witnesses
Inventor
W. R. Oberdahn
By Attorney

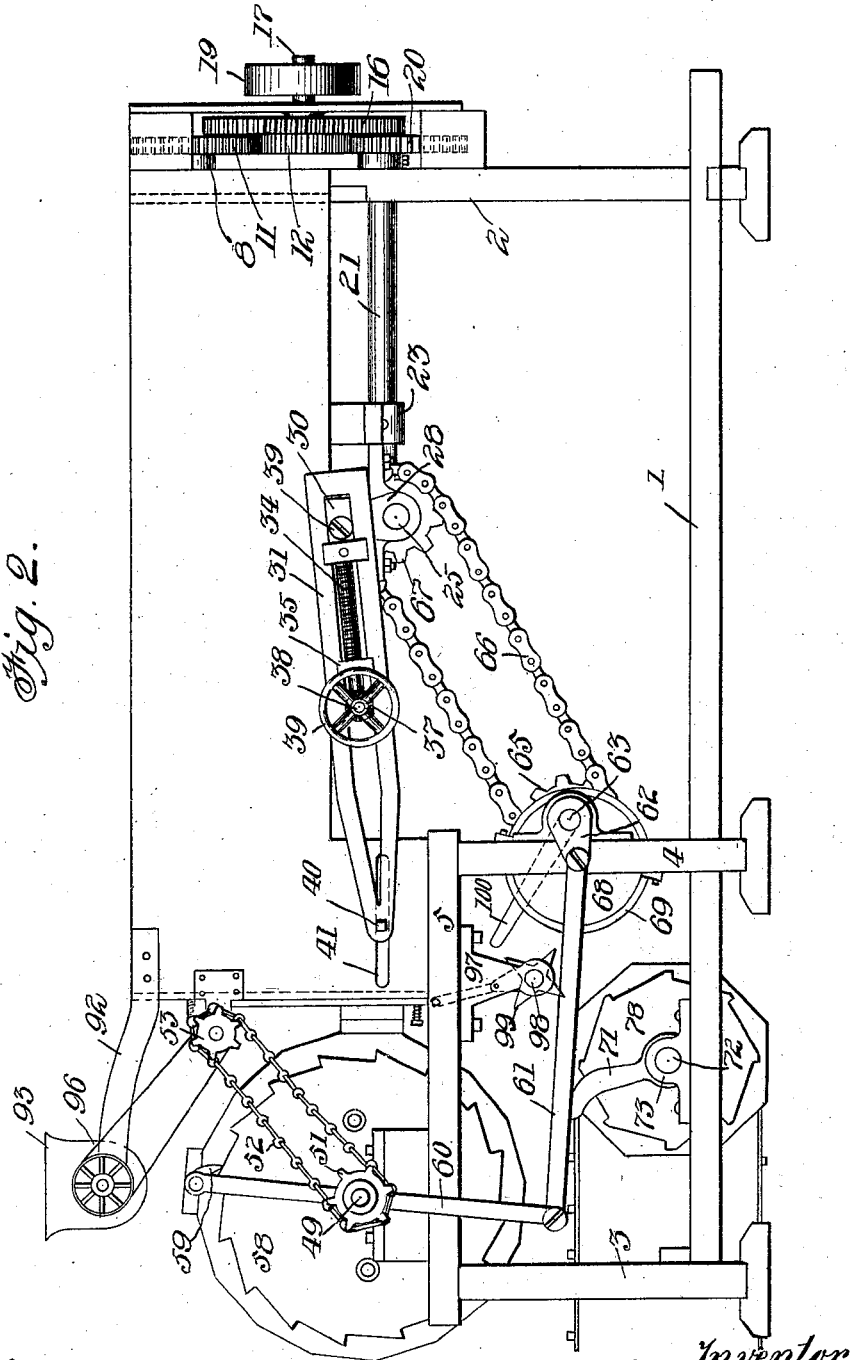

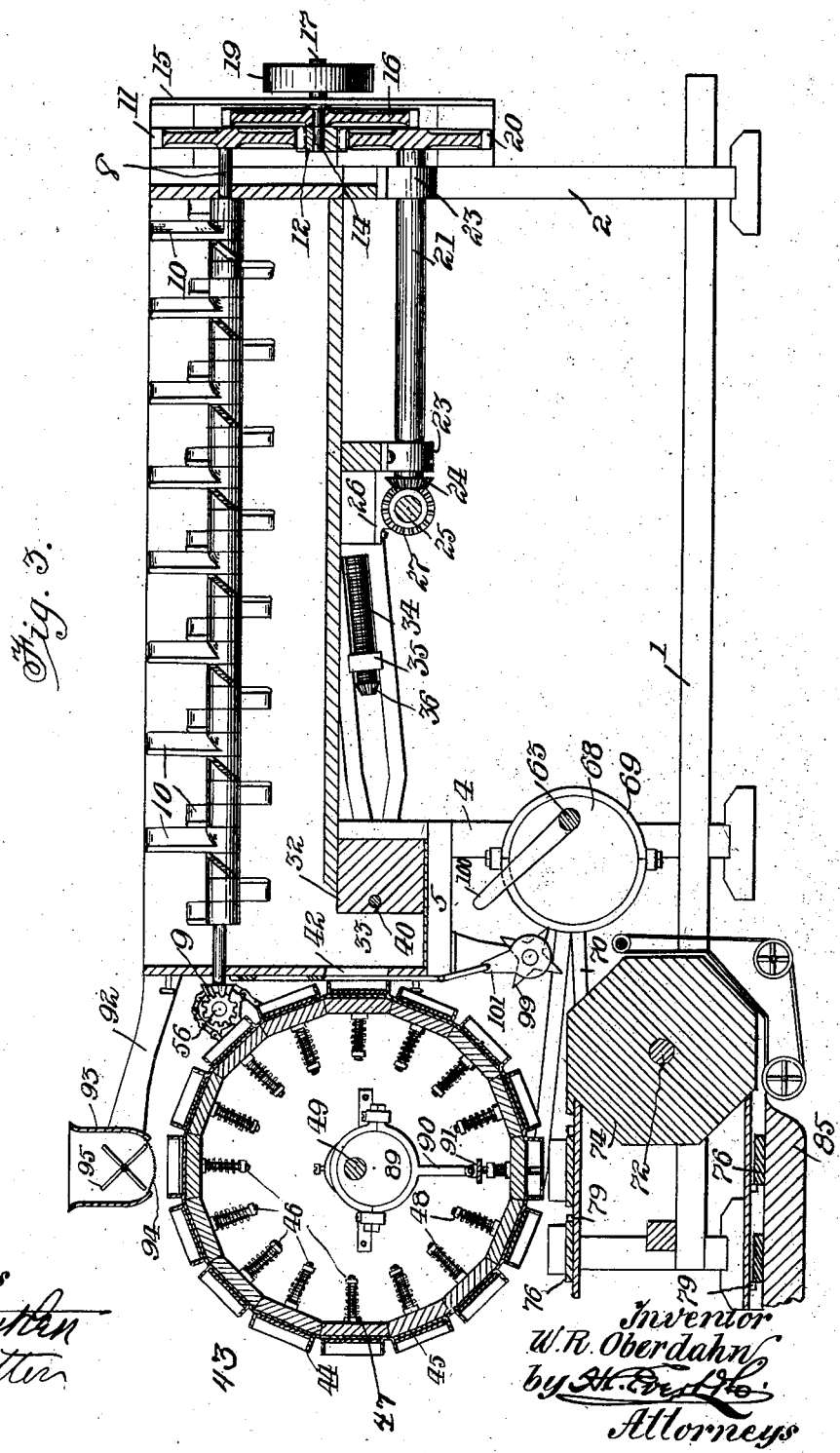

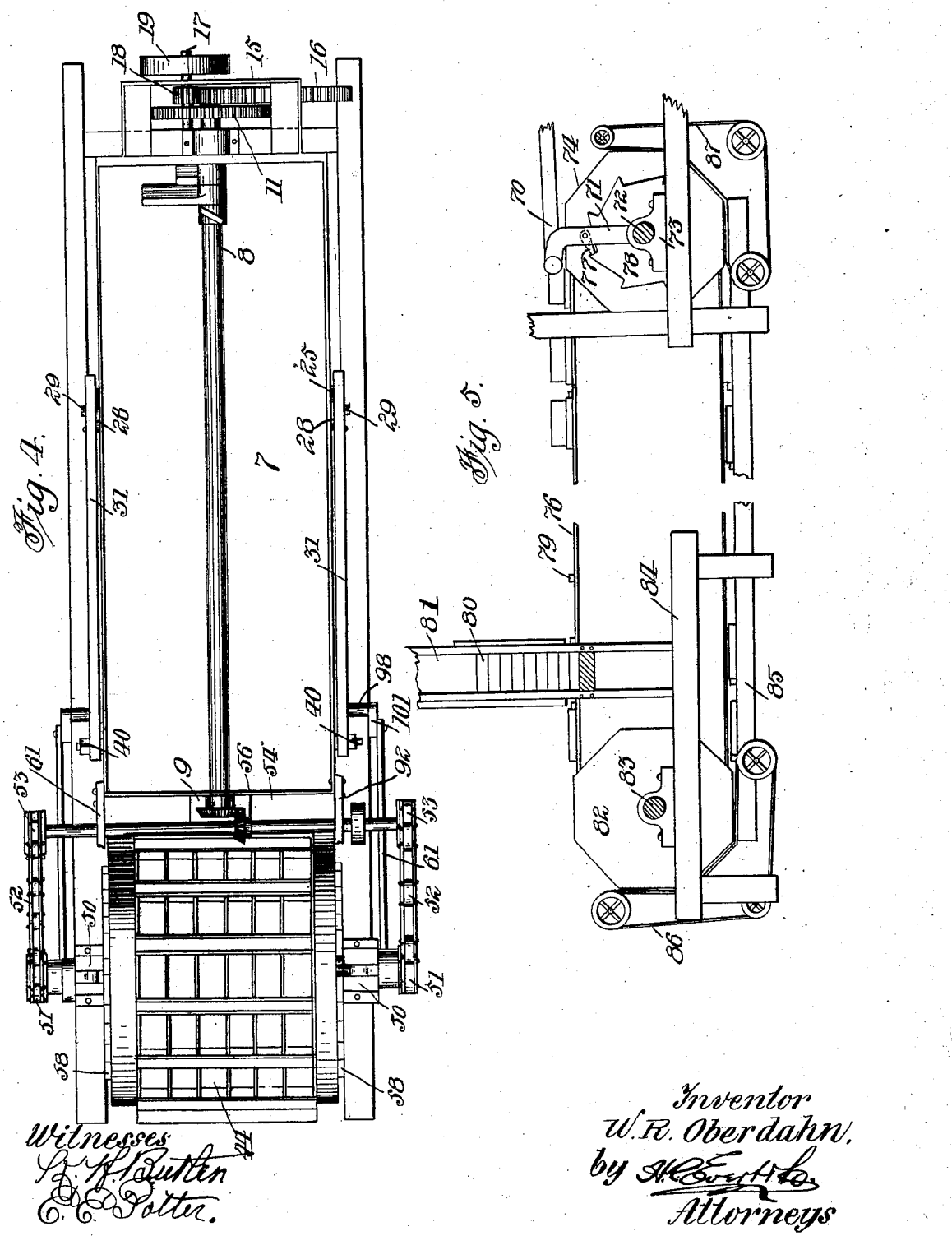

No. 750,059. PATENTED JAN. 19, 1904.
W. R. OBERDAHN.
BRICK MAKING MACHINE.
APPLICATION FILED MAR. 2, 1903.
NO MODEL. 5 SHEETS—SHEET 5.
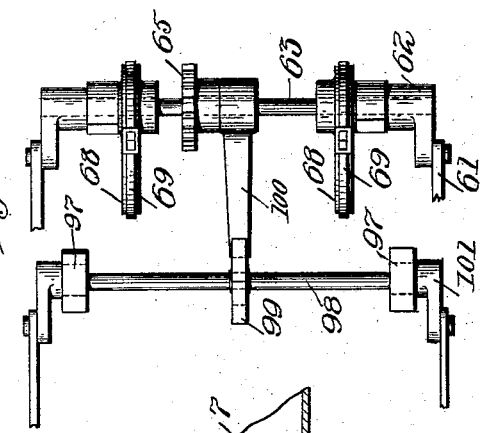
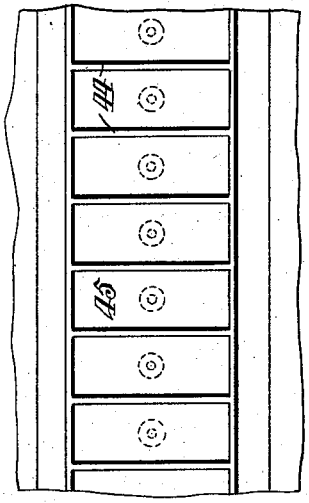
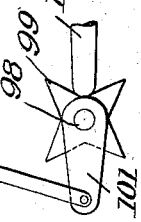
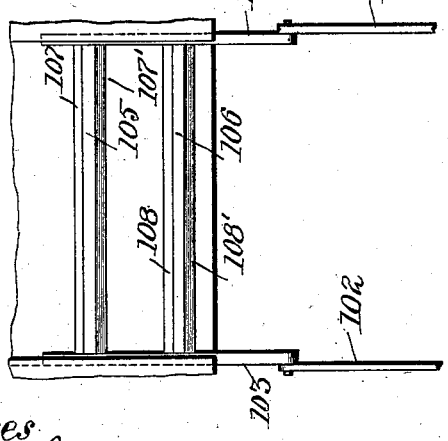
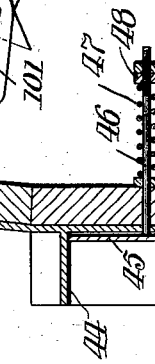
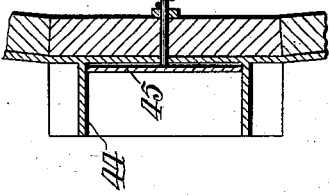
Witnesses
Inventor
W. R. Oberdahn.
by
Attorneys No. 750,059. Patented January 19, 1904.

UNITED STATES PATENT OFFICE.

WALTER R. OBERDAHN, OF EAST McKEESPORT, PENNSYLVANIA.

BRICK-MAKING MACHINE.

SPECIFICATION forming part of Letters Patent No. 750,059, dated January 19, 1904.

Application filed March 2, 1903. Serial No. 145,738. (No model.)

*To all whom it may concern:*

Be it known that I, WALTER R. OBERDAHN, a citizen of the United States of America, residing at East McKeesport, in the county of Allegheny and State of Pennsylvania, have invented certain new and useful Improvements in Brick-Making Machines, of which the following is a specification, reference being had therein to the accompanying drawings.

This invention relates to certain new and useful improvements in brick-making machines in which are embodied the elements of a series of molds arranged in circular or wheel form, a pug-mill for feeding the clay to said molds, packing or plunger mechanism for filling the molds, automatically-operated cutting-off devices, pressing mechanism for discharging the bricks from the molds, automatically-operated sanding mechanism for the molds, and a subjacent endless belt carrying detachable pallets or plates adapted to receive the bricks from the molds and carry the same to a suitable or desired point.

My invention therefore resides in the special construction and arrangement of these parts, together with the other features entering into my invention, as will be hereinafter more specifically described and then pointed out in the appended claims, and in describing the invention in detail reference will be had to the accompanying drawings, forming a part of this application, and wherein like numerals of reference will be employed to designate like parts throughout the different views of the drawings, in which—

Figure 1 is a detail perspective view of my improved machine with the sanding-receptacle broken away and the endless carrying-belt removed. Fig. 2 is a side elevation of my improved machine with the carrying mechanism partially broken away. Fig. 3 is a central longitudinal sectional view with the carrying mechanism partially broken away. Fig. 4 is a top plan view with the sanding mechanism and the carrying mechanism removed. Fig. 5 is a side elevation of the carrying mechanism, partially broken away. Fig. 6 is a front elevation of the cutting-off mechanism. Fig. 7 is a sectional view of the same, showing a part of the pug-mill and also showing the actuating mechanism for the cutting-off mechanism. Fig. 8 is a top plan view of the actuating mechanism for the cutting-off device. Fig. 9 is a cross-sectional view of one of the molds, and Fig. 10 is a detail plan view of one row of the molds removed from the wheel.

Although I have shown herein and will describe a particular form of supporting-frame, yet it will be observed that alterations may be made therein without departing in any manner from the invention. This frame embodies two lower side rails 1, two rear standards or supports 2, front standards or supporting-legs 3, intermediate supporting standards or legs 4, and top front rails 5. The side rails are connected together by cross-braces 6. The pug-mill 7 is supported from this frame, being attached to the rear supporting-legs 2 and the top front rails 5. Journaled in this pug-mill is a conveyer-shaft 8, the rear end of which extends through the rear wall of the pug-mill, and the front end of which extends through the front end of said mill and carries a bevel-gear 9 thereon. A plurality of conveyer arms or fingers are mounted on this shaft 8, as shown at 10, and these are so inclined on one face as to cause the clay in the mill to be forced toward the front end of the mill by the revolution of the arms. On the rear end of this shaft is mounted a gear 11, which meshes with a pinion 12, mounted on a stub-shaft 14, journaled in the frame 15 and pug-mill rear wall, and on this stub-shaft 14 is also mounted a gear 16 for engagement with the pinion 18 of the shaft 17. A drive-shaft 17 is also journaled in the frame and rear wall of the pug-mill, and this drive-shaft carries a pinion 18, which meshes with the gear 16, said drive-shaft also carrying a belt-pulley 19 to receive the drive-belt. (Not shown.) The pinion 12 also meshes with a gear 20, carried on the rear end of the operating-shaft 21 for the plunger mechanism. This shaft 21 is journaled in bearing-brackets or bearings 23, suspended from the pug-mill, and has a bevel-gear 24 on its forward end. This driving mechanism, as shown and described, is a practical form of the same; but it will be evident that the gearing may be materially altered without changing the spirit of the invention. A cross-shaft 25 is journaled in bearings 26, suspended from the pug-mill, and has a bevel-gear 27 thereon to mesh with the bevel gear or pinion 24. On the ends of the cross-shaft 25 are cranks 28, the wrist-pins 29 of which engage in bearings 30, mounted in slotted connecting-rods 31. These connecting-rods are attached at their forward ends to the plunger 32, which operates in the space 33 in the pug-mill at the forward end thereof. The connection of the cranks with the rods is made adjustable, so as to vary the throw of the plunger, and to this end the wrist-pins of the cranks are connected in bearings, as stated, and these bearings 30 are connected to screws 34, which operate through blocks 35, mounted in the slots of the connecting-rods and provided at their forward ends with bevel-pinions 36, which are engaged by pinions 37 of like form mounted on a cross-shaft 38, provided at one end with a suitable hand or operating wheel 39.

The pins 40, which connect the connecting-rods to the plunger, operate in slots 41, provided therefor in the walls of the chamber 33. The front wall of the pug-mill is provided with an opening 42, through which the clay is forced by the plunger 32 into the molds to be later described.

The molds as employed by me embody a series of molds placed in a row, and these rows of molds are circumferentially arranged on a rotatable wheel and the rows of molds successively brought into position in front of the opening in the pug-mill to have the clay forced therein. To this end I employ a wheel 43, on the periphery of which the molds are placed in rows. The molds 44 have a discharging plate or presser 45 therein, to which is attached a rod 46, extending through the rim of the wheel, with a spring 47 arranged thereon between the said rim of the wheel and a nut 48 mounted on the outer ends of the several rods. The ends of these spring-pressed rods are engaged by a bar carried by arms connected to eccentrics, as will be more fully described, and the presser-boards 45 thereby forced outwardly to discharge the bricks from the mold. The wheel is provided with closed ends, and these closed ends are loosely mounted on a shaft 49, journaled in bearings 50, supported by the top front rails 5. The shaft 49 therefore rotates independently of the wheel carrying the molds, the shaft rotating once during each actuation of the wheel to bring the next row of molds into position. To this end there is mounted on the ends of the shaft 49 sprocket-wheels 51, driven by chains 52, operating over sprocket-wheels 53, mounted on the ends of a shaft 54, journaled in bearings 55, carried by the front end of the pug-mill. This shaft 54 carries a bevel-pinion 56, which is engaged by the bevel-pinion 9 on the end of shaft 8. The shaft 8 is preferably extended through a bracket-bearing 57 at the front of a pug-mill, as seen in Fig. 1.

Connected to the ends of the wheel carrying the molds are ratchet-wheels 58, actuated by pawls 59, carried on the upper ends of rock-arms 60, through which the shaft 49 extends. The lower ends of these arms 60 are attached to pitmen 61, having their other ends attached to cranks 62, carried on a shaft 63, that is journaled in bearings 64, carried by the supporting standards or legs 4. This shaft 63 carries a sprocket-wheel 65, which is engaged by a drive-chain 66, operating over said wheel and over a sprocket-wheel 67, mounted on the shaft 25. Mounted on the shaft 63 is a pair of eccentrics 68, the straps 69 of which are connected by pitmen 70 to cranks 71, mounted on a shaft 72, journaled in bearings 73, mounted on the rails 1. On this shaft 72 is mounted a sprocket or bearing wheel 74, over which the pallet-bearing belt 76, which receives the molded bricks, travels. The cranks 71 carry pawls 77, which engage with ratchet-wheels 78, carried by the ends of the sprocket or belt-bearing wheel 74. The pallet-bearing belt is provided with lugs 79 to engage the pallets 80 as the belt passes through the pallet-receiving receptacle 81, which is placed any desired distance in front of the machine, the belt also traveling over a sprocket or bearing wheel 82, carried on a shaft 83, which is journaled in suitable bearing carried by the frame 84, that is placed at a desired distance in front of the machine. In order to retain the pallets on the belt, a guard 85 is provided, over which the belt travels, belts 86 and 87, respectively, being provided at the ends of said guard, and these belts traveling over suitably-disposed pulleys. The shaft 49, as stated, is driven by the chains 52, and mounted on this shaft within the mold-carrying wheel is a pair of eccentrics 89, having arms 90 connected to their straps, and these arms 90 carry a cross-bar 91, which engages with the ends of the rods 46 for depressing the boards 45 to discharge the molded bricks from the molds onto the pallet-plates, as seen in Fig. 3 of the drawings.

In the manufacture of bricks it is always preferable to "sand" the molds in order that the brick may be easily discharged therefrom after being molded. With my invention I aim to automatically perform this operation, and to this end I attach to the pug-mill a pair of forwardly-extending brackets or arms 92, which support a sand box or receptacle 93, provided with a perforated or screen bottom 94. In this sand box or receptacle is mounted an agitator 95, which may be operated by belt or chain 96, connecting with the shaft 54. By this means the molds will be kept constantly sprinkled with sand prior to their being brought into position to receive the clay.

Cutting-off mechanism is also provided to cut off the clay smooth or level with the outer end of the mold after the clay has been forced into the mold. To this end I provide brackets 97, attached to the rails 5 and in which is journaled a shaft 98. On this shaft is mounted a star-wheel 99, which is engaged and actuated by an arm 100, mounted on the shaft 63. The shaft 98 carries cranks 101, connected by links or pitmen 102 with slides 103, which operate in guides 104 in the front of the pug-mill. These slides 103 carry knives 105 and 106, the knife 105 having cutting edges 107 107' and the knife 106 having cutting edges 108 108'. These knives operate vertically in front of the opening 42 in the pug-mill, one of the knives making a complete cut across the face of one row of molds with each actuation of the star-wheel 99 by the arm 100. To describe this operation, we will assume that the knives are up at the limit of their travel. On the first actuation of the shaft 98 the cutting edge 108' of the knife 106 performs the first cutting operation, and on the next or succeeding operation of the shaft 98 the cutting edge 107' of the knife 105 is brought into action, and the knives have then been moved down to the limit of their downward movement, and on the upstroke thereof the edge 107 of the knife 105 makes the first cut, and on the next actuation the edge 108 of the knife 106 performs the cutting operation.

In operation the clay is placed in the pug-mill and the shaft 8 thereof rotated, causing the conveyer-arms on said shaft to feed the clay forward in the mill into the clay-receiving chamber 33 at the forward end thereof. The driving of the conveyer-shaft 8 rotates the shaft 54 through the medium of the meshing pinions 9 and 56, communicating motion to the shaft 49 through the medium of the chains 52. At this time the agitator of the sanding-receptacle is also being operated by the belt or chain connection therewith from the shaft 54, so as to sprinkle the sand upon the molds prior to their being brought into position to receive the clay. The gearing which imparts movement to the conveyer-shaft also simultaneously drives shaft 21 and through the medium of chain 66 imparts motion to shaft 63, whereby to actuate pitmen 61, operate rocker-arms 60, and cause the pawls 59 to engage the ratchet-wheels 58 to move one row of molds forward into position to receive the clay. The operation of shaft 25, due to the operating of shaft 21, has caused connecting-rods 31 to move the plunger 32 forward, so as to force the clay in chamber 33 into the row or series of molds moved into position in front of the opening 42, and at this time the arm 100 strikes star-wheel 99, so as to bring one of the cutting-knives across the face of the opening and cut off the clay from the molds. The continued operation of the machine moves the row or series of molds just filled out of the filling position and brings another row or series of same into position, and as the loaded molds reach the lowest point, directly over the belt carrying the pallets, the presser-bar 98 engages the rods 46, forcing the presser-boards 45 downwardly and discharging the molded bricks upon the pallets provided therefor on the belt 76. The shaft 49 by undergoing a total revolution to each movement of the mold-wheel operates the cross-bar 91 so as to successively engage the rods 46. The bricks are removed from the belt prior to the latter passing to the pallet-receptacle. These pallets are loosely placed in the receptacle, and the underneath one of the series is engaged by the successive lugs on the belt as the latter passes through the receptacle, the pallets being carried along by these lugs along the under side of the belt, due to the guard or casing below the belt, so as to be carried up into position on top of the belt to receive the molded bricks. Thus the operation is made continuous, the machine requiring no attention except the attendant to remove the molded bricks from the belt and to keep the pallet-receptacle loaded.

Having fully described my invention, what I claim as new, and desire to secure by Letters Patent, is—

1. In combination with a pug-mill, and a conveyer and clay-separating means, a wheel provided with a series of molds loosely mounted on a shaft, means for rotating the said shaft continuously, means for rotating the said wheel intermittently, and means actuated by the shaft for ejecting the clay from the molds.

2. In a brick-making machine, a wheel provided on its periphery with a plurality of molds, a shaft on which the said wheel is loosely mounted, presser-plates arranged in the said molds, rods connected to said plates and extending inwardly within the wheel, eccentrics secured to said shaft, straps for said eccentrics, provided with depending arms, a plate secured to the said depending arms of the straps and adapted to successively engage the said rods, in combination with means for operating the said shaft and wheel.

3. The combination with a rotatably-mounted shaft, of a wheel loosely mounted on the said shaft, and molds mounted on said wheel, plates arranged in said molds, spring-retracted rods secured to said plates, and extending inwardly within the wheel, means mounted on the shaft for successive engagement with the said rods, means for rotating the said wheel, and means for rotating the said shaft independently of the said wheel.

4. In combination with a pug-mill, and a rotatably-mounted mold-carrying wheel, a ratchet-wheel movable with the said first-named wheel, a shaft carrying a star-wheel, a cutter-bar operated by said shaft, a lever carrying a dog for engagement with the said ratchet-wheel, and means for operating said lever, said means including an arm engaged by the said star-wheel.

5. In combination with a shaft, of the mold-carrying wheel loosely mounted on said shaft, a ratchet-wheel carried by said first-named wheel, a lever carrying a dog loosely mounted on said shaft adapted to engage the said ratchet-wheel, means for rotating the said shaft, and means independent of the said first-named means for oscillating said lever.

6. In combination with a shaft and a wheel provided on its periphery with a plurality of molds, said wheel being loosely mounted on said shaft, means for moving said wheel intermittently, means for moving said shaft a complete revolution for each movement of said wheel, ejecting means for said molds and means actuated from said shaft for actuating said ejecting means.

In testimony whereof I affix my signature in the presence of two witnesses.

WALTER R. OBERDAHN.

Witnesses:
   H. C. EVERT,
   E. E. POTTER.